UNITED STATES PATENT OFFICE 2,362,337

PROCESS OF MAKING 2-AMINOOXAZOLE

George W. Anderson, Stamford, Conn., assignor to American Cyanamid Company, New York, N. Y., a corporation of Maine No Drawing. Application July 31, 1942,
Serial No. 453,047

3 Claims. (Cl. 260—307)

This invention relates to new chemical compounds and more particularly relates to 2-aminooxazole.

In accordance with the present invention the new compound 2-aminooxazole, represented by the following formula:

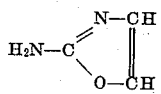

is prepared, and which compound is useful as an intermediate in the preparation of azo dyes and in the preparation of sulfonamide derivatives.

Suitable methods for preparing 2-aminooxazole in accordance with my invention will be fully described in conjunction with the following specific examples. It should be understood, however, that the examples are given by way of illustration only and the invention is not to be limited by the details set forth therein. The parts are by weight except in the case of liquids which are parts by volume.

Example 1

502 parts by weight of alpha, beta-dichloroethyl ether are added to a warm solution of 420 parts of urea in 1,055 parts of water. The mixture is refluxed on an oil bath with mechanical stirring for six and a half hours. After standing at room temperature for sixteen hours, the resulting solution is extracted with 200 parts of ether in two portions.

The water solution remaining is made strongly alkaline by adding 300 parts of solid sodium hydroxide. After cooling, this solution is extracted with 8 portions of ether of 200 parts each. The ether extracts are combined and dried several hours over flaked sodium hydroxide.

Distillation of the filtered ether solution to dryness leaves a residue of 2-aminooxazole. This is purified by several crystallizations from heptane or octane, using decolorizing carbon. Colorless crystals are obtained.

Example 2

132 parts by volume of bromine are slowly added to 132 parts by volume of paraldehyde. The temperature is maintained at 5°–10° C. by ice cooling. After about two hours, the addition is complete. The reaction product is stirred until the bromine color disappears (about ¾ hour). It is then added in a slow stream to a solution of 180 parts by weight of urea in 660 parts of water. During the addition, the mixture is heated on the steam bath to start the reaction; the heat formed by the reaction keeps the temperature at about 90° C. thereafter. The addition takes about ¾ hour. Steam heat is applied for another hour; during the last few minutes decolorizing carbon is added.

The product is filtered. After standing over night, the red solution is extracted with ether, then made alkaline by the addition of 240 parts by weight of sodium hydroxide. Aminooxazoline is extracted from this solution with ether and purified as described in Example 1.

It is apparent from the disclosures in the foregoing examples that 2-aminooxazole is produced by reacting urea with a halo acetaldehyde. The halo acetaldehydes are not particularly stable compounds, and I have found it convenient to prepare them in solution and react directly with urea without requiring their isolation. It is clearly understood, however, that I can utilize halo acetaldehydes generally in my process and my invention is not to be limited to those methods specifically illustrated. Practically, however, the process is limited to the use of chloro acetaldehyde and bromo acetaldehyde because of the relative inactivity of iodine and the difficulty in handling fluorine compounds. It is a distinct advantage of the present invention that the readily obtainable chloro acetaldehyde and bromo acetaldehyde are admirably suited for carrying out the process.

In the recovery of the 2-aminooxazole the reaction mixtures are preferably made alkaline by the addition of sodium hydroxide prior to extraction with an organic solvent. Instead thereof other alkali metal hydroxides, alkaline earth metal hydroxides, or ammonium hydroxides may be employed. Included among such hydroxides are potassium hydroxide, lithium hydroxide, calcium hydroxide, ammonium hydroxide, and the like.

It is obvious that the above description and examples are intended to be illustrative only and that they may be varied or modified to a considerable extent without departing from the spirit of the invention or sacrificing the advantages thereof. I do not, therefore, intend to limit myself to the specific embodiments herein set forth except as indicated in the appended claims.

What I claim is:

1. A process for producing 2-aminooxazole which comprises reacting urea with a member of the group consisting of chloro acetaldehyde and bromo acetaldehyde, said reaction being carried out by refluxing an aqueous solution of the reactants.

2. The process for producing 2-aminooxazole which comprises reacting urea with chloro acetaldehyde, said reaction being carried out by refluxing an aqueous solution of the reactants.

3. A process for producing 2-aminooxazole which comprises reacting urea with bromo acetaldehyde, said reaction being carried out by refluxing an aqueous solution of the reactants.

GEORGE W. ANDERSON.